Patented Dec. 22, 1953

2,663,638

UNITED STATES PATENT OFFICE 2,663,638

COLOR CORRECTION OF MULTICOLOR FILM BY INTEGRAL STYRYL DYE MASKING IMAGES

Karl Otto Ganguin, Norman Hulton Haddock, and Eric Macdonald, Blackley, Manchester, England, assignors to Imperial Chemical Industries Limited, a corporation of Great Britain No Drawing. Application August 22, 1949, Serial No. 111,765

Claims priority, application Great Britain September 15, 1948

8 Claims. (Cl. 95—2)

This invention relates to a process for the production of dyestuffs and more particularly to a process for the production of dyestuffs for the formation of masking images in colour photography.

The dyestuffs and pigments used in practice in subtractive processes of colour photography do not possess ideal special absorption curves. In addition to absorbing light in the desired part of the spectrum, they also absorb some light in other parts of the spectrum and as a result of this the colour reproduction is never ideal. For example magenta dyestuffs formed by colour development from colour formers of the pyrazolone series absorb the desired complementary coloured green light and in addition absorb undesirably a certain amount of blue light. It has been proposed (see for example The Journal of the Photographic Society of America, volume 13, 94–96, February 1947) to correct for these deficiencies by the use of an automatic masking method whereby coloured colour formers are used, the light absorption of the coloured colour former being equal or approximately equal to the undesired light absorption of the developed dyestuff. For example the colour former which is used in a photographic layer to form a magenta dyestuff on colour development may itself be coloured yellow so that it absorbs blue light at an intensity equal to the undesired blue absorption of the magenta dyestuff formed by colour development. Accordingly the unchanged colour former itself forms the coloured mask and the blue absorption of the photographic layer is a constant value (irrespective of the green absorption of the magneta image), which if desired can be compensated for by using a suitable filter when printing.

The coloured colour formers it has been proposed to use in the above process are compounds containing the group —N=N—R where R is an aromatic or heterocyclic radical. The —N=N—R group is split off during the development with an aromatic amino compound and replaced by the phenylimino radical derived from the aromatic amino compound. Apart from the difficulties caused by the use of a coloured layer, particularly in multilayer films, the main practical objection to the above automatic masking process lies in the fact that the reaction of coloured colour formers of this kind with the aromatic amino compounds used for development is usually much slower than the reaction of the normal colourless colour formers with the aromatic amino compounds.

We have now discovered a masking process in which we obviate the practical difficulties involved in using this kind of coloured colour former by using a colourless colour former and, after developing the image, converting the residual colour former into a colour mask.

In our new masking process the mask is a yellow styryl dyestuff image which may for example be formed by reacting with an aromatic aldehyde, the residual magenta colour former (which contains a reactive methylene group) and there is no necessity for any special treatment of the residual colour formers in the other layers which it is not desired to convert into masking dyestuffs.

The process of our invention is particularly valuable for use in three colour subtractive processes of colour photography in which there are used multilayer films which contain yellow, magenta and cyan colour formers in three separate layers and in which the colours are produced in the layers by developing the films with colour forming developers, for example with alkaline solutions of aromatic amino compounds, such as for example p-diethylaminoaniline. In such processes a colour mask is mainly required in the "magenta layer" (that is the layer containing the magenta dyestuff) to correct for the imperfect light absorption of the latter.

According to our invention therefore we provide a subtractively coloured multilayer photographic element which comprises a base and superimposed thereon three layers containing a cyan image, a magenta image and a yellow image respectively, characterised in that the layer which contains the magenta image contains also a yellow styryl dyestuff masking image. A photographic element of this type wherein the cyan, magenta and yellow images, i. e., the main color images, are azomethine dyestuffs and the masking image is a yellow styryl dyestuff, as more specifically illustrated in the ensuing examples, possesses the inherent property that the styryl mask may be discharged without affecting the azomethine dyestuffs forming the main color images. This property is highly desirable because it permits the characteristics of the main color images, and the fog, to be accurately measured.

According to a further feature of our invention we provide an improved process for colour photography which comprises developing with a colour forming developer, an exposed multilayer photographic element wherein there is present in at least one of the layers a magenta colour former which contains in its molecular structure a reactive methylene group, and subsequently treating the photographic element with an aromatic aldehyde of the benzene or naphthalene series which contains at least one auxochromic group, or with a functional derivative thereof.

As already indicated the magenta colour former should contain in its molecular structure a reactive methylene group. As examples of suitable classes of magenta colour formers (that is to say compounds which yield magenta dyestuffs when the exposed photographic element is developed with a colour forming developer, for example p-N:N-diethylaminoaniline) there may be mentioned: pyrazolones, for example 1 - (4' - phenoxy - 3 - sulphophenyl) - 3 - heptadecyl-5-pyrazolone; oxindoles, for example oxindole itself and N-amyl oxindole; rhodanines, for example N-ethyl rhodanine; diketopyrazolidines, for example 1:2-diphenyl or 1:2-di(p-chlorophenyl)-3:5 - diketopyrazolidine, coumaranones, thioindoxyls, cyanoacetyl compounds, for example the mono-p-(omega-cyanoaceto)anilide of octadecenylsuccinic acid, cyanoacetylurea and its N-substituted derivatives, and imidazolones.

As the yellow and cyan colour formers for use in the process of our invention there may be used those yellow and cyan colour formers which are customarily used in three colour subtractive processes of colour photography in which the colours are developed by treating the exposed film with alkaline solutions of aromatic amino compounds. As yellow colour formers there are preferably used compounds of the acylacetylarylamide series, for example p-stearyl-aminobenzoylacetanilide-p'-carboxylic acid, and as cyan colour formers there are preferably used compounds of the 1-naphthol series, for example the product obtained by condensing 1-hydroxy-2-naphthoyl chloride with oleylamine and sulphonating. These yellow and cyan colour formers give no dyestuff with an absorption band in the visible part of the spectrum when treated with the aromatic aldehydes used for forming the masking image in the magenta layer.

The colour former may if desired be dissolved in a water-insoluble water-permeable binder and the solution dispersed in a silver halide photographic emulsion containing gelatin. Alternatively if the colour former is of the non-diffusing kind, for example one containing a substituent which renders it non-diffusible in gelatin, for example a long alkyl chain, it may be incorporated in a photographic emulsion by adding it directly to the silver halide emulsion as a water-soluble salt.

The aromatic aldehyde of the benzene or naphthalene series used for forming the masking image by reaction with the residual colour former in the magenta layer must contain at least one auxochromic group, for example a hydroxy or amino group or a substituted hydroxy or amino group. For example there may be used 2:4-dimethoxybenzaldehyde or an aldehyde of the formula $RNH—C_6H_4—CHO$ or $R_1R_2N—C_6H_4—CHO$ where R, $R_1$ and $R_2$ are alkyl, aryl, aralkyl, hydroxyalkyl, halogenoalkyl, cyanoalkyl, nitroalkyl, carboxyalkyl or sulphoalkyl, or where $R_1$ and $R_2$ together with the nitrogen atom form part of a 5- or 6-membered ring, and where the benzene nucleus may carry substituents such as for example, nitro, alkyl, halogen, sulphonic acid or carboxylic acid groups.

By this treatment with an aromatic aldehyde there is obtained a yellow styryl dyestuff positive masking image alongside the magenta azomethine dyestuff negative image.

By suitable choice of aromatic aldehyde for use with any particular magenta colour former, for example by suitable choice of $R_1$ and $R_2$ in the above formula, a masking colour can be obtained which possesses the required absorption characteristics to compensate for the undesired blue absorption of the magenta azomethine dyestuff obtained by colour development with the aromatic amine such as for example p-diethylaminoaniline.

In carrying out the process of the invention the photographic element after exposure and colour development is treated with a solution of the aromatic aldehyde or functional derivative thereof in a suitable solvent before being washed, bleached and fixed in the normal manner. For practical convenience it is preferred to use an aldehyde or functional derivative thereof which is soluble in water or in aqueous acid or alkali.

We have found that by the use of a functional derivative of an aldehyde in place of the aldehyde itself, a much more rapid reaction occurs with the residual magenta colour former to form the yellow styryl dyestuff, and this forms a preferred feature of our invention. As examples of such functional derivatives there may be mentioned the anils and arylhydrazones, preferably those which contain solubilising groups. For example there may be used the anils obtained by condensing p - N:N - diethylaminobenzaldehyde with aniline -o-, m-, or p-sulphonic acid which are soluble in dilute aqueous alkali, but it is usually advantageous to select a functional derivative which gives a solution in water, for example the anil obtained by condensing p-N:N-diethylaminobenzaldehyde with aniline-2:5-disulphonic acid since the aqueous solutions of such functional derivatives react with the residual colour former at a satisfactory rate and are quite stable under the conditions normally employed in the processing operations and show no appreciable decomposition after standing for a prolonged time. Alternatively a functional derivative of an aldehyde (for example an aldehydeanil) containing one sulphonic acid group may be solubilised by forming a soluble bisulphite derivative. If the color developed photographic element is treated with such a solution, the masking colour is produced when the film is transferred without washing, to an alkaline bath, for example a 5% aqueous solution of sodium carbonate, or preferably to a ferricyanide bleaching bath, as used in the normal processing.

In order to decrease the overall fog of the masking image due to the unused colour former, the quantity of magenta colour former in the emulsion layer should be so adjusted that in the areas of maximum exposure there is substantially no residual magenta colour former left after colour development with the aromatic amino compound, or, alternatively, the photographic element after exposure and colour development should be treated in a tanning-bleaching bath which produces an imagewise hardening of the layer and prevents the reaction between the colour former and the aldehyde or functional derivative thereof in the exposed parts of the layer.

The process of our invention may be used to obtain positive-masking images alongside the normal negative images obtained by exposure and primary colour development. Alternatively it may be used in association with reversal processes so that negative-masking images are obtained alongside the normal positive images and this forms a still further feature of our invention. For example the multilayer material is exposed to light from an image or to light transmitted by a colour transparency, developed with a black and white developer, re-exposed to white light and developed with a colour forming developer, treated with the aldehyde or functional derivative thereof, bleached and finally fixed.

The invention is illustrated but not limited by the following examples in which the parts are by weight:

Example 1

A multilayer light sensitive photographic film is made up as follows:

A support material is coated with a layer of red-sensitive emulsion containing 10 grams per litre of the cyan colour forming component described in Example 10 of British specification 465,823. Upon this layer there is coated a green sensitive emulsion containing 10 grams per litre of the magenta colour forming component 1-(4'-phenoxy-3'-sulphophenyl)-3-heptadecyl-5-pyrazolone sodium salt. A layer of colloidal silver is now coated on to act as a yellow filter layer, and finally a layer of unsensitised (that is, blue sensitive) emulsion containing 10 grams per litre of the colour forming component described in Example 3 of British specification 486,848. The film is exposed to light and developed in a solution of the following composition:

| | Parts |
|---|---|
| p-N:N-diethylaminoaniline hydrochloride | 3 |
| Sodium sulphite anhydrous | 1 |
| Sodium carbonate anhydrous | 60 |
| Potassium bromide | 2 |
| Water to | 1,000 |

The film is washed and treated with a solution of the following composition:

| | Parts |
|---|---|
| p-N:N-diethylaminobenzalanil-3-sulphonic acid | 4 |
| Sodium carbonate | 1 |
| Water to | 1,000 |

The film is then transferred into a bleaching bath solution of the following composition:

| | Parts |
|---|---|
| Potassium ferricyanide | 100 |
| Potassium bromide | 25 |
| Water to | 1,000 |

After washing, the film is fixed in a 25% sodium thiosulphate aqueous solution and finally washed.

The processed material contains in the bottom (previously red-sensitive) layer a cyan dyestuff negative image; in the middle (previously green-sensitive) layer a magenta dyestuff negative image and a yellow styryl dyestuff positive image which serves as a mask to correct for the undesirable absorption of blue light by the magenta dyestuff; in the top (previously blue sensitive) layer a yellow dyestuff negative image.

When the negative transparency so obtained is used for making positive prints, duplicate or separation negatives, the colour fidelity and brightness is improved as compared with reproduction from negative transparencies which have not been masked as described herein.

In place of the magenta colour forming component used in the above example, there may be used an equal weight of the mono p-(omega-cyanoaceto)-anilide of octadecenyl-succinic acid.

Example 2

In place of the solution of p-N:N-diethylaminobenzalanil-3-sulphonic acid used in Example 1 there may be used for the production of the yellow masking image a solution of the following composition:

| | Parts |
|---|---|
| p-(N-methyl-N-sulphoethylamino) benzaldehyde | 5 |
| Potassium carbonate | 50 |
| Water to | 1,000 |

Example 3

In place of the solution of p-N:N-diethylamino-benzal-anil-3-sulphonic acid used in Example 1, there may be used for the production of the yellow masking image a dilute aqueous sodium carbonate solution of p-ethylaminobenzal-(4-methyl-2-sulpho)anil.

Example 4

A multilayer material made up as described in Example 1 is exposed to light from an original scene or a colour transparency and developed first with a black and white developer of the following composition:

| | Parts |
|---|---|
| Sodium sulphite anhydrous | 25 |
| Metol | 2 |
| Hydroquinone | 14 |
| Potassium bromide | 2 |
| Potassium thiocyanate | 2.5 |
| Sodium hydroxide | 2 |
| Potassium carbonate | 40 |
| Sodium sulphate anhydrous | 10 |
| Water to | 1,000 |

The film is washed, re-exposed to light from a tungsten lamp and developed in the colour developer solution described in Example 1. It is then transferred to a solution of the following composition:

| | Parts |
|---|---|
| p-(Omega:omega'-dicyanodiethyl-amino)-benzal-anil-2-sulphonic acid | 5 |
| Sodium carbonate | 1 |
| Water to | 1,000 |

The film is then bleached and fixed in the usual manner as described in Example 1. Alongside the magenta dyestuff positive image in the middle (previously green sensitive) layer there is produced a yellow styryl dyestuff negative image which serves as a mask to compensate for the undesired blue absorption of the magenta dyestuff. The absorption maximum of the yellow dyestuff is at 440 m$\mu$.

In place of the anil used in the above example there may be used the anil formed by reacting p-(omega:omega'-dicyanodiethylamino)-benzaldehyde with 1-methoxy-2-amino-5-sulphonic acid, 1-methoxy-4-amino-5-sulphonic acid, 1-amino-4-acetylamino-6-sulphonic acid or 3-nitroaniline-4-sulphonic acid.

Example 5

A multilayer material is exposed and colour developed as described in Example 1. The film is then washed and treated with a tanning-bleaching solution of the following composition:

| | Parts |
|---|---|
| Potassium ferricyanide | 38 |
| Potassium bromide | 57 |
| Potassium dichromate | 36 |
| Acetic acid | 20 |
| Water to | 1,000 |

The film is washed and transferred into a solution of the following composition:

| | Parts |
|---|---|
| p - (Omega:omega'-dichlordiethyl-amino)-benzal-anil-4-sulphonic acid | 5 |
| Sodium carbonate | 1 |
| Water to | 1,000 |

The film is washed, fixed and finally washed in the usual manner. Alongside the magenta dyestuff negative image in the middle (previously green sensitive) layer there is produced a yellow styryl dyestuff positive image which serves as a mask to compensate for the undesired blue absorption of the magenta dyestuff. The absorption maximum of the yellow dyestuff is at 445 m$\mu$.

In place of the anil used in the above example, there may be used an equal weight of 4-(omega:-omega' - dihydroxydiethylamino) - 2 - methyl-benzal-anil-4'sulphonic acid, or of one of the anils obtained by reacting sulphanilic acid with 4 - dimethylamino - 3 - nitrobenzaldehyde, 4-diethyl - amino - 2 - chlorobenzaldehyde, or p-(omega:omega' - dinitrodiethylamino)benzaldehyde, or by reacting aniline with sulphonated p-diethylaminobenzaldehyde.

*Example 6*

A multilayer material is exposed and colour developed as described in Example 1. The film is then washed and treated with a solution of the following composition:

| | Parts |
|---|---|
| p - (N-methyl-N-sulphoethyl-amino)-benzal-p'-nitrophenylhydrazone | 5 |
| Sodium carbonate | 1 |
| Water to | 1,000 |

The film is washed, bleached and fixed in the usual manner as described in Example 1, when a similar masking image is obtained.

*Example 7*

5 parts of p-(N-methyl-N-omega-cyanoethyl-amino)benzal-anil-3-sulphonic acid are suspended in 150 parts of water at 80° C. and dissolved by the addition of 10 parts of sodium bisulphite. The solution is cooled and diluted to 1000 parts by the addition of water. A multilayer photographic material is exposed and colour developed as described in Example 1, washed and treated with the solution of the bisulphite compound so obtained. After a short rinse the film is transferred to an alkaline bath made by dissolving 50 parts of sodium carbonate in 1000 parts of water. The film is washed, bleached and fixed in the usual way and contains a positive yellow styryl dyestuff mask alongside the negative magneta image.

*Example 8*

5 parts of p-di-(ethylcarboxymethyl)amino-benzal-anil-3-sulphonic acid are suspended in 150 parts of water at 60° C. and dissolved by the addition of 10 parts of sodium bisulphite. The solution is cooled and diluted to 1000 parts by the addition of water.

A multilayer material is exposed and colour developed as described in Example 1, washed and treated with the above solution. After a short rinse the film is transferred to a bleaching bath of the following composition:

| | Parts |
|---|---|
| Potassium ferricyanide | 100 |
| Potassium bromide | 25 |
| Water to | 1,000 |

The film is washed, fixed and finally washed in the usual manner. It contains alongside the negative image, a positive yellow styryl dyestuff mask possessing an absorption maximum of 428 m$\mu$.

We claim:

1. A process for the production of a color-corrected photographic transparency from multilayer film having differently sensitized silver halide emulsion layers containing color formers adapted to yield yellow, magenta, and cyan-colored images in separate layers by coupling with the development product of a primary amino developing agent and wherein the color former which is adapted to form a magenta image contains in its molecular structure a reactive methylene group, which comprises the steps of exposing the film to light, color developing to said colored images by treating said layers with said primary amino developing agent, and subsequently treating the film with an aromatic aldehyde containing an auxochromic group whereupon a yellow styryl dyestuff masking image is obtained in the magenta colored layer and retaining the colored images and masking image in said layers.

2. A process for the production of a color-corrected color photographic transparency as set forth in claim 1 wherein the aromatic aldehyde containing an auxochromic group is selected from the group of formulae consisting of:

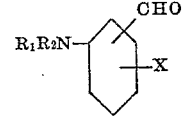

and

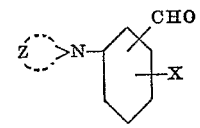

wherein $R_1$ is a radical selected from the group consisting of alkyl, aryl, aralkyl, hydroxyalkyl, halogenoalkyl, cyanoalkyl, nitroalkyl, carboxyalkyl and sulphoalkyl radicals, $R_2$ is a radical selected from the group consisting of hydrogen, alkyl, aryl, aralkyl, hydroxyalkyl, halogenoalkyl, cyanoalkyl, nitroalkyl, carboxyalkyl, and sulphoalkyl radicals, Z represents the atoms necessary to complete a heterocyclic radical selected from the group consisting of five and six membered heterocyclic radicals, and wherein X is a radical selected from the group consisting of hydrogen, nitro, alkyl, halogen, sulphonic acid, and carboxylic acid radicals.

3. A process for the production of a color-corrected color photographic transparency as set forth in claim 1 wherein a functional derivative of the aromatic aldehyde containing an auxochromic group is used, said functional derivative being an aldehyde-anil containing at least one sulphonic acid group.

4. A process for the production of a color-corrected color photographic transparency as set forth in claim 1 wherein a functional derivative of the aromatic aldehyde containing an auxochromic group is used, said functional derivative being a water-soluble aldehyde-anil containing at least one sulphonic acid group.

5. A process for the production of a color-corrected color photographic transparency as set forth in claim 1 wherein a functional derivative of the aromatic aldehyde containing an auxochromic group is used, said functional derivative being a water-soluble bisulphite derivative of an aldehyde-anil containing a sulphonic acid group.

6. A process for the production of a color-corrected color photographic transparency as set forth in claim 1 wherein the magenta color former is a pyrazolone derivative carrying a substituent which renders it non-diffusible in gelatin.

7. A process for the production of a color-corrected color photographic transparency as set forth in claim 1 wherein said multi-layer film comprises a base having the color formers arranged to yield colored images in the order of cyan, magenta and yellow from the base outwards.

8. A colored multilayer photographic element which comprises a base having superimposed thereon three layers, one of said layers containing a cyan azomethine dyestuff image, the second of said layers containing a magenta azomethine dyestuff image and the other of said layers containing a yellow azomethine dyestuff image, said element being characterized in that the layer which contains the magenta image also contains a yellow styryl dyestuff masking image said masking image possessing the property of being dischargeable without appreciably affecting the other color images in said element.

KARL OTTO GANGUIN.
NORMAN HULTON HADDOCK.
ERIC MACDONALD.

References Cited in the file of this patent
UNITED STATES PATENTS

| Number | Name | Date |
| --- | --- | --- |
| 2,193,931 | Michaelis | Mar. 19, 1940 |
| 2,306,410 | Schinzel | Dec. 29, 1942 |
| 2,357,388 | Duerr et al. | Sept. 5, 1944 |
| 2,431,996 | Duerr et al. | Dec. 2, 1947 |
| 2,449,966 | Hanson | Sept. 21, 1948 |
| 2,518,739 | Young | Aug. 15, 1950 |